May 31, 1927.

O. L. PRIME

WASHOUT PLUG

Filed Aug. 29, 1925

1,630,761

Inventor:
Orton L. Prime
By
Attorneys

Patented May 31, 1927.

1,630,761

UNITED STATES PATENT OFFICE.

ORTON L. PRIME, OF MILWAUKEE, WISCONSIN.

WASHOUT PLUG.

Application filed August 29, 1925. Serial No. 53,364.

This invention relates to wash out plugs for boilers.

In wash out plugs for boilers it is the practice to remove the plug and insert the nozzle or tool into the opening. This insertion of the tool is likely to damage the threads if the threads are relatively fine and also in the usual style or plugs will frequently damage the seat between the plug and the surrounding member or bushing. In addition to this, it is difficult in replacing the plugs to make sure that no trash or grit is collected on the internal seat of the bushing which would interfere with the complete and adequate seating of the replaced plug.

This invention is designed to overcome the above noted defects, and objects of such invention are to provide a washout plug which cooperates with its bushing and has a seat exterior to the aperture through the bushing which is preferably tapered and which cooperates with the coarse threads to secure a water tight seal between the plug and the bushing at this tapered seat.

Further objects are to provide a brass or similar plug adapted to cooperate with a steel or iron bushing and to provide the plug with a central pin having a polygonal exterior and formed of iron or steel to resist wear.

An embodiment of the invention is shown in the accompanying drawings, in which:—

Figure 1:
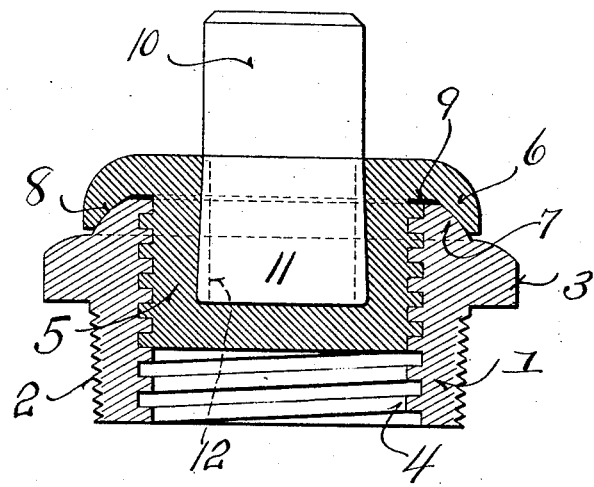
Figure 1 is a sectional view through the plug corresponding to a section on the line 1—1 of Figure 2.
Figure 2:
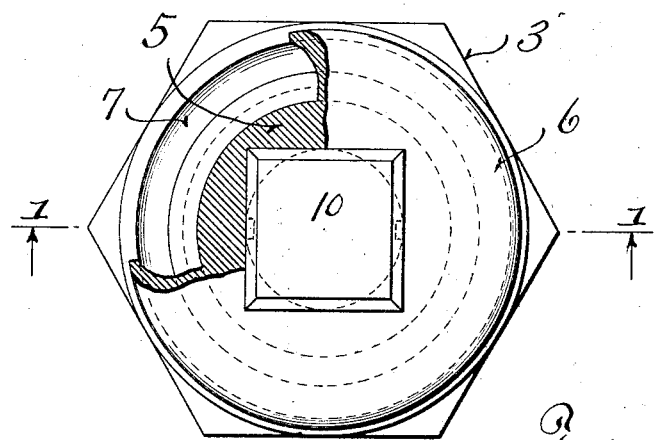
Figure 2 is a plan view of the structure shown in Figure 1, with parts broken away for clearness.

The plug comprises a steel or iron bushing 1 which is provided with tapered relatively fine threads 2 on its exterior so that it may be screwed into place in a water tight manner. In order to facilitate this operation the bushing is provided with an upper flange 3 having hexagonal or similar contour. This bushing is provided with relatively coarse, preferably square, internal threads 4 with which a similarly threaded brass plug 5 cooperates. This brass plug is provided with an overhanging flange 6 at its outer end. The overhanging flange 6 and the upper portion 7 of the bushing are tapered and preferably are rounded, as indicated at 8, so as to provide a tapered relatively extensive seat between the flange 6 and the bushing. As stated, this tapered seat is preferably rounded and may be formed as of any suitable surface of revolution, for instance, spherical. The space 9 is left between the outwardly projecting portion of the flange 6 and the upper extension 7 of the bushing so that the curved and tapered faces only of the plug and bushing will contact when the plug is screwed into place and an intimate and reliable seating will be secured.

In view of the fact that the plug is of relatively softer material, an iron or steel manipulating pin 10 is provided and is securely positioned within the plug. This pin is preferably polygonal at its upper end and round at its lower end, as indicated at 11. This rounded lower portion is preferably flared towards its end to insure retention within the plug and is provided with recesses 12 into which corresponding portions of the plug 5 are positioned.

Preferably in connecting the pin and plug the process disclosed in my Patent No. 1,334,051 of March 16, 1920, is employed and the plug is forced into intimate engagement with the pin in accordance with such process.

It will be seen that the manipulating pin 10 may be gripped by wrenches without marring it as it is of hard material, and that no damage results to the plug 5 which is of softer material. Further, inasmuch as the plug 5 is of brass or similar material and the bushing 1 of steel or iron, it is clear that rusting of the plug to the bushing cannot occur even after extended use.

It is to be particularly noted that when the plug is removed and a nozzle or other tool inserted into the bushing during the cleaning operation, such tool will not damage the external tapered and rounded seat 8 as it will not contact therewith under any condition. Thus, even after repeated washings no damage is done the seating surface and the plug will always seat in a firm and secure water tight manner.

It will be seen further that the construction disclosed herewith is extremely simple and may be readily produced and will be effective in operation.

Although the invention has been described in considerable detail, it is to be understood that the invention may be variously embodied and is, therefore, to be limited only as claimed.

I claim:

A plug comprising a bushing having an aperture therethrough, said aperture being threaded, said bushing having an externally threaded portion and having a projecting flange adjacent its outer end and having a beveled seating surface spaced both from the outer edge of the flange and from the outer end of the bushing, a removable plug screwed into the internally threaded aperture of said bushing, said plug having a projecting flange provided with a surface contacting with the beveled seating surface of said bushing, the flange of said plug being inwardly turned towards the flange of said bushing and stopping short of the flange of said bushing, the flange of said plug having a cut-away portion spaced from the end of said bushing when said plug is screwed into place.

In testimony that I claim the foregoing I have hereunto set my hand at Milwaukee, in the county of Milwaukee and State of Wisconsin.

ORTON L. PRIME.